L. EMBREY.
APPARATUS FOR WORKING DOUGH AND THE LIKE.
APPLICATION FILED JULY 6, 1917.

1,334,024.

Patented Mar. 16, 1920.
7 SHEETS—SHEET 1.

L. EMBREY.
APPARATUS FOR WORKING DOUGH AND THE LIKE.
APPLICATION FILED JULY 6, 1917.
1,334,024.
Patented Mar. 16, 1920.
7 SHEETS—SHEET 3.
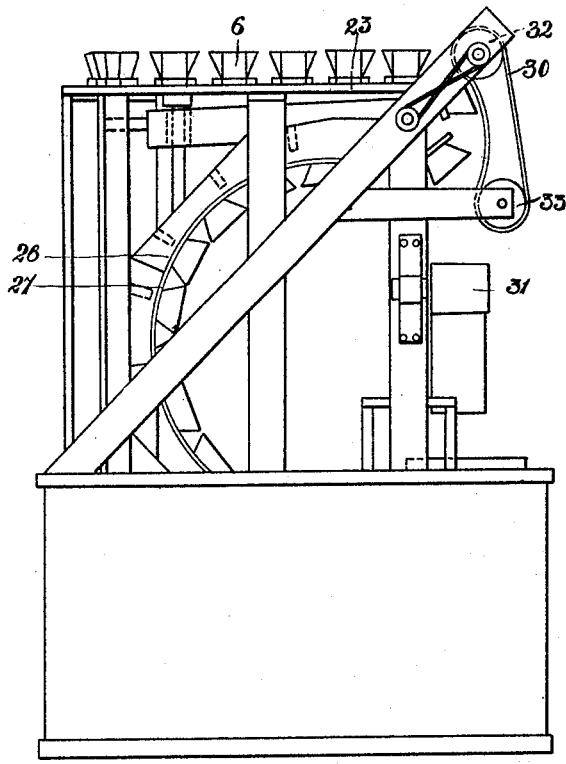
Fig. 3.
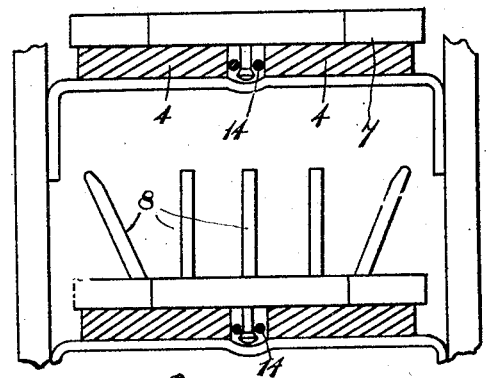
Fig. 8.
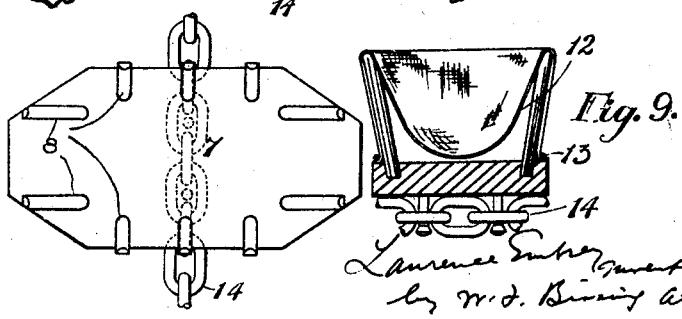
Fig. 10.
Fig. 9.

L. EMBREY.
APPARATUS FOR WORKING DOUGH AND THE LIKE.
APPLICATION FILED JULY 6, 1917.
1,334,024.
Patented Mar. 16, 1920.
7 SHEETS—SHEET 4.
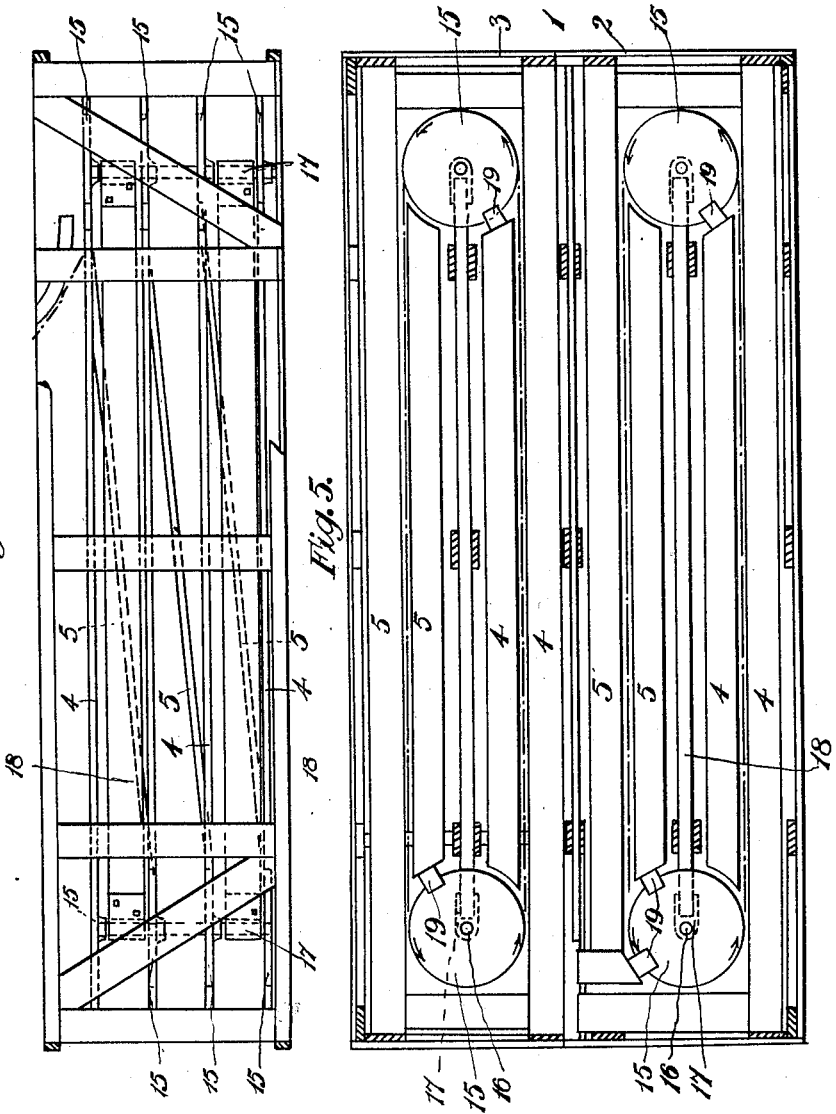

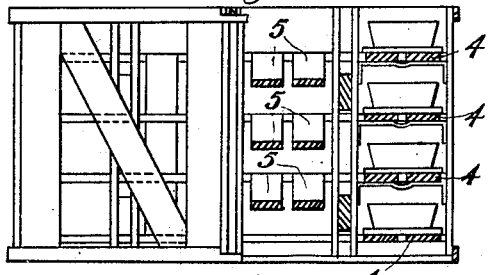
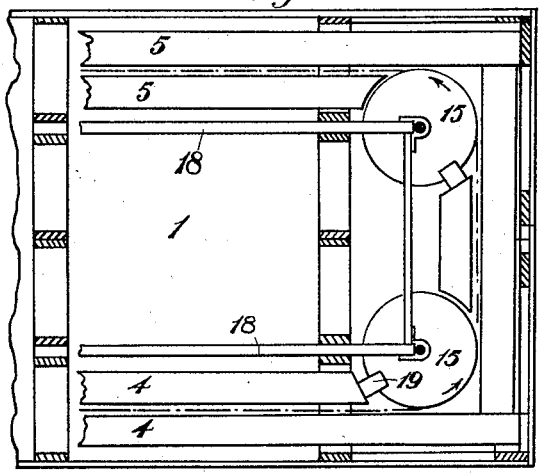

L. EMBREY.
APPARATUS FOR WORKING DOUGH AND THE LIKE.
APPLICATION FILED JULY 6, 1917.

1,334,024.

Patented Mar. 16, 1920.
7 SHEETS—SHEET 6.

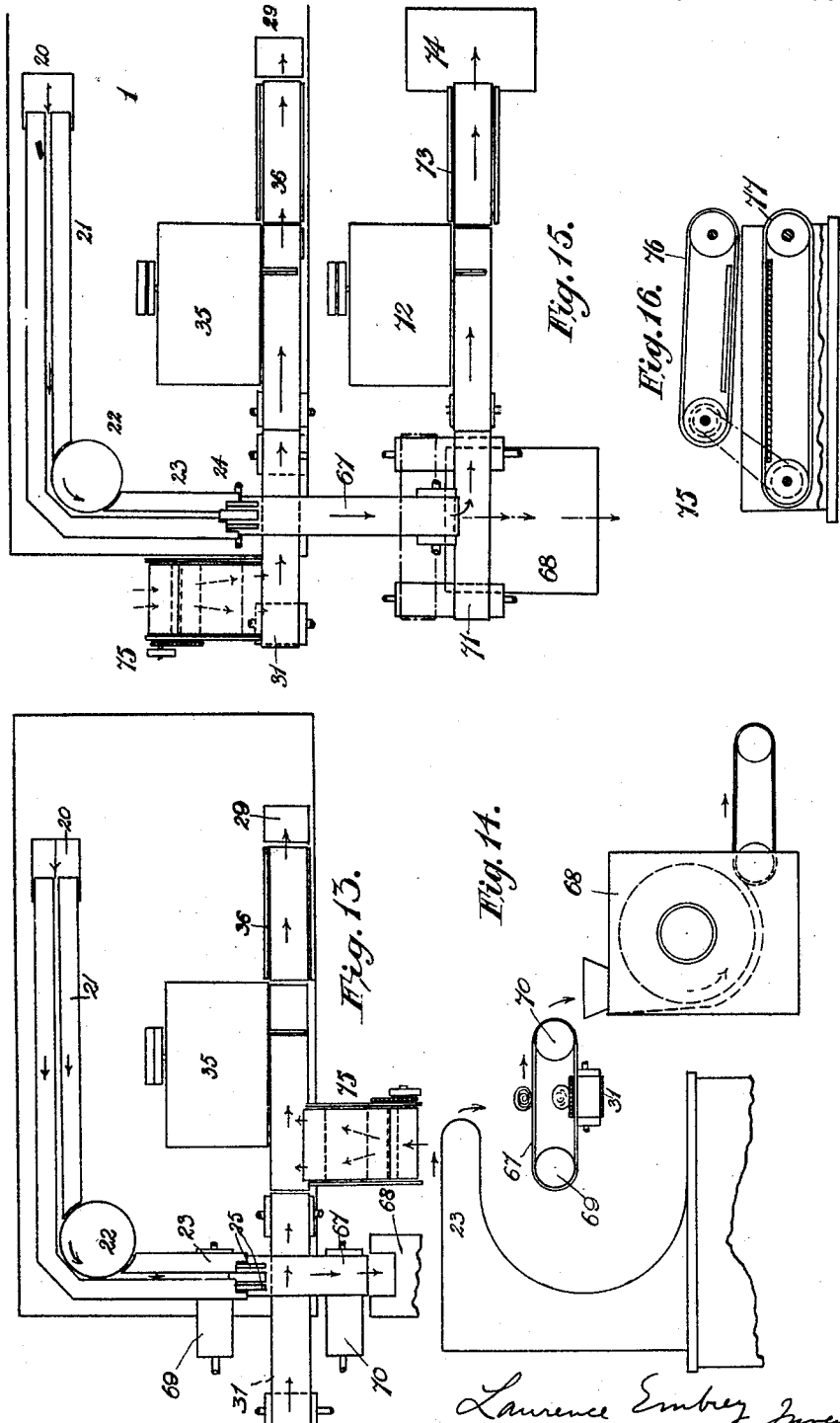

UNITED STATES PATENT OFFICE.

LAURENCE EMBREY, OF FENTON, ENGLAND.

APPARATUS FOR WORKING DOUGH AND THE LIKE.

1,334,024.

Specification of Letters Patent. Patented Mar. 16, 1920.

Application filed July 6, 1917. Serial No. 173,975.

*To all whom it may concern:*

Be it known that I, LAURENCE EMBREY, a subject of the King of Great Britain, residing at Fenton, Staffordshire, England, have invented certain new and useful Improvements in Apparatus for Working Dough and the like, of which the following is a specification.

In the specifications of patents issued to me under Nos. 1,147,491; 1,179,294; 1,169,472, I have described processes and apparatus for working fermented dough whereby the dough is molded in such a manner that the gluten is stretched and remains stretched during the ensuing proving operation.

It is frequently an advantage to subject the dough to a succession of molding operations with an interval of proof, and to insure a definite interval of proof between molding and shaping operations. It is also desirable that such operations should be carried out automatically, sometimes continuously, and sometimes intermittently.

The invention comprises an apparatus for carrying out the aforesaid operations of mechanically working dough efficiently and within a comparatively confined space, and also means for enabling the same apparatus to be used to vary the treatment of the dough when required.

In the drawings:—

Figures 1, 2 and 3 are respectively a front elevation, plan and elevation of a combined molder, preliminary shaper and prover for use according to the invention.

Figs. 4, 5 and 6 are respectively a side elevation, a plan and an end elevation half in section, illustrating one form of construction for the casing and tracks for the conveyer of the prover. In Fig. 4 the outer boarding is removed to show the tracks; in Fig. 5 the top is removed for the same purpose; in Fig. 6 the boarding is removed from the left hand half, and a few carriers are shown in position on some of the tracks on the right hand portion.

Fig. 7 is a fragmentary plan showing the lowermost tracks and the mode in which the conveyer chain or cable is passed from one set of zig-zag tracks to another.

Fig. 8 is a detail cross sectional view illustrating one form of support for the tracks.

Figs. 9 and 10 are respectively a cross sectional end view and a plan of a simple form of carrier, the carrier being shown with a fabric lining in Fig. 9.

Figs. 13 and 14 are respectively a diagrammatic plan and end view illustrating one combination of apparatus for a small installation.

Fig. 15 is a diagrammatic plan illustrating another combination of apparatus suitable for a large installation.

Fig. 16 is a diagrammatic sectional elevation of a former or device for lightly rolling or extending a clot of dough.

Figure 1:
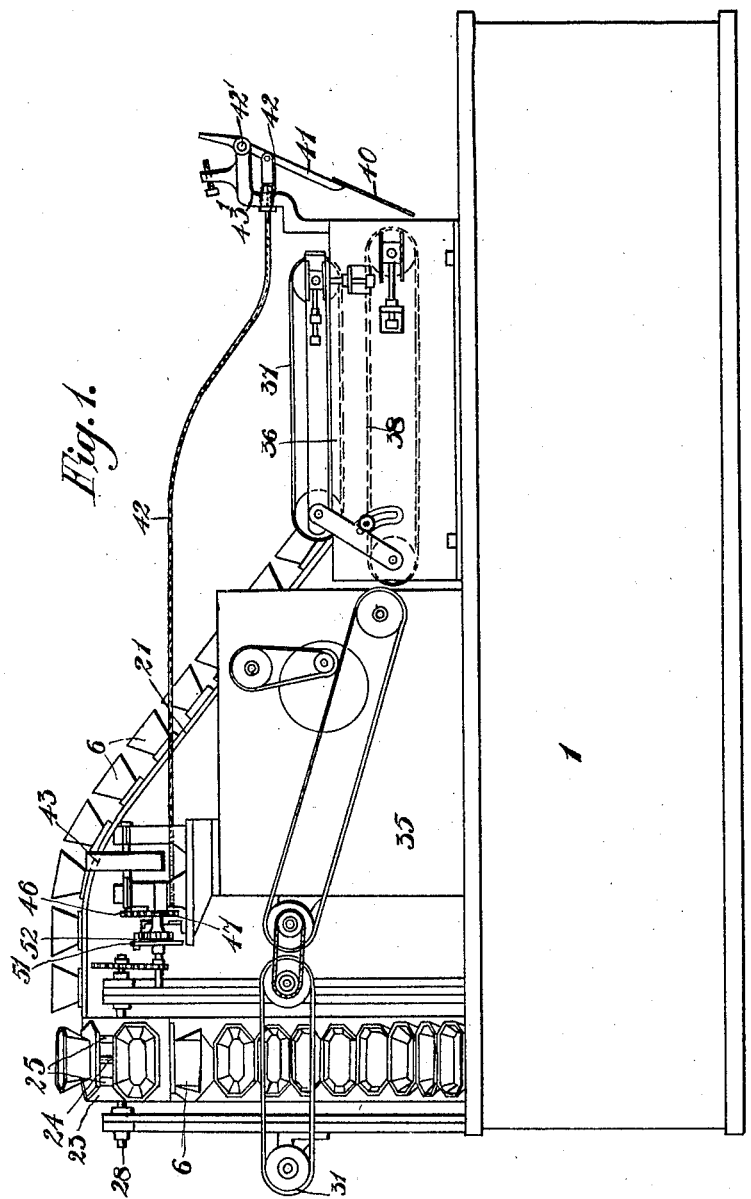

In carrying out the invention according to one mode a molding machine 35 of the type described in the specification of United States Letters Patent No. 1,171,331, is fitted with a preliminary shaper 36 comprising two superposed endless bands 37, 38, driven in opposite directions at different speeds whereby the molded or worked piece from the molding machine is rolled into a substantially cylindrical form. This machine 35 and preliminary shaper 36 are mounted on a table preferably forming the top of a proving apparatus, comprising a casing 1 of wood or other suitable material and preferably in two detachable sections 2, 3, so as to facilitate passage through narrow door-ways when being assembled in a bakery, the self-contained sections being joined along the center in any convenient manner.

Figure 2:
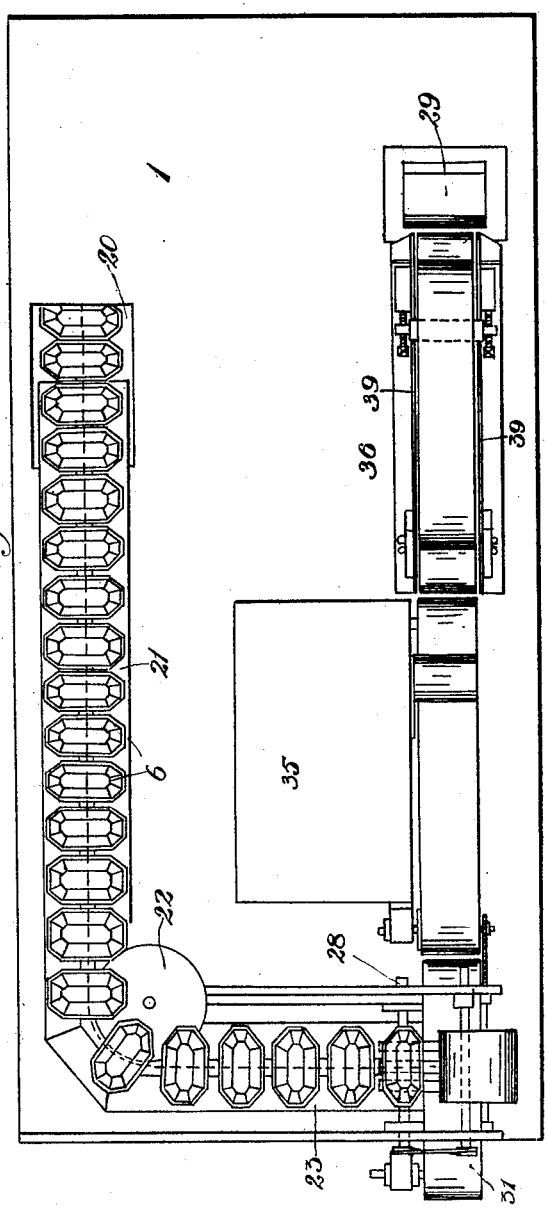

The casing contains two sets of tracks, there being one set in each section comprising spaced boards or rails 4, 4, and 5, 5. The rails 4, 4, are horizontal while the rails 5, 5, are inclined. The rails 4, 4, may also be inclined if desired. The tracks form guides for carriers 6 of any suitable form to suit the material to be carried. They may be in the form of buckets as indicated in Figs. 1 to 3, or may simply comprise plates or bases 7 provided with pins 8 as indicated in Figs. 8 to 10, which can be covered with a removable fabric lining 12 clipped in place by an elastic ring 13 or otherwise secured. The linings can be removed and washed. They also assist in the removal of the dough when the carriers are inverted as hereinafter explained. The carriers are secured by pins, screws or otherwise to an endless chain 14, so that they are free to swivel relatively to one another. The chain 14 is passed around pulleys 15 supported in shafts 16 at the ends of the tracks.

Bearings 17 on struts 18 may take the stress applied to the pulley shafts by the conveyer chain, and foot-step bearings or simply metal plates may take the vertical stress of the shafts. The pulleys 15 may be sprocket wheels or similar to the pulleys of chain pulley-clocks according to the type of chain used. The upper faces of the pulleys are adapted to act as guides or supports for the carriers as they pass around from one portion of the track to another, and in order to avoid the carriers fouling the rims of the pulleys, thin sheet metal guides 19 may be provided. By reference to Figs. 4, 5 and 6 it will be seen that the tracks form a continuous substantially spiral or zig-zag path for the conveyer within the casing, the course of the chain being indicated by dot-and-dash lines. When the conveyer has completed one zig-zag course on the rails 4, 4, 5, 5, of one set in one section of the casing it passes across to the set in the other section as indicated in Fig. 7. In the first or front set the carriers gradually descend from the upper part of the casing to the lower, whereas in the other or rear set they gradually ascend to the top emerging finally through a hole 20, Fig. 2 in the top. Here an inclined track 21 leads them up to a pulley 22 then on to a looped track 23, and thence down and into the casing again on to the first or front set of tracks. The looped track 23 is provided with a vertical pulley or sprocket wheel 24 and if desired with guide pulleys 25 at the head of the loop. As the carriers pass over these pulleys they are inverted and discharge their contents. In order to retain them on the track while inverted and while they are passing down the return curve 26, retaining flanges 27 of metal or other material are provided.

The shaft 28 of the pulleys 24, 25, may form the driving shaft of the conveyer, any suitable driving mechanism being used. If desired the shafts 16 may also be driven so as to better distribute the stress on the chain, for example all the shafts may be interconnected by chain, belt, or toothed gearing in any well known manner. The driving mechanism adopted may be arranged to give a continuous feeding motion or an intermittent motion.

A guard in the form of a band 30 of fabric may prevent the dough falling out of the carriers prematurely and may be used to direct them on to a conveyer 31 or on to any other conveyer or into a receptacle as required. The guard 30 may be carried on free rollers 32, 33, one roller being driven, but this is not essential as the rollers may be carried by a frame swinging freely about the shaft of the roller 32 the band merely moving under the friction of the dough with it.

After traveling in a circuitous manner in the casing 1 the conveyer rises up an inclined track 21 around a pulley 22, and thence over a looped portion of track 23 and back into the casing 1. As the conveyer passes around the end of the looped portion of track 23 the carriers 6 are inverted to discharge their contents. By way of example, the conveyer indicated in Fig. 1 is driven by the rotation of a sprocket wheel or pulley 24 over which the chain passes, guide pulleys 25 being arranged on the same shaft 28 as the sprocket wheel. Pieces of dough to be treated are placed on a conveyer 31 by which they are fed to the molder 35 by which they are coiled under tension for the purpose set forth in specification No. 1,179,294, and are then passed through the shaper 36 by which they are shaped with a rolling action as described in specification No. 1,169,472. The flat bands 37 and 38 of the shaper 36 arranged in between flat side plates 39, impart a neat cylindrical shape to the pieces of molded dough which as they are delivered, fall through an opening 29 in the top of the casing 1 into the conveyer within the casing. It is preferred to provide means by which the conveyer within the casing may be driven in synchronism with the delivery of the pieces of dough from the shaper 36. As an example of such means the following arrangement is indicated in Figs. 1, 4 and 5.

A plate 40 carried by a lever 41 pivoted at 42' on a bracket 43' is arranged opposite to the delivery end of the shaper 36. Whenever a piece of dough is delivered from the shaper 36 it strikes the plate 40 and moves the lever 41 to which is attached one end of a Bowden wire 42. The movement thereby imparted to the wire 42 is utilized to operate trip mechanism which releases intermittent driving mechanism of the conveyer so that the conveyer moves forward sufficiently to bring the next carrier beneath the opening 29 ready to receive the next piece of dough, the conveyer remaining stationary until that piece is delivered by the shaper 36 and falls into the carrier.

Figure 11:
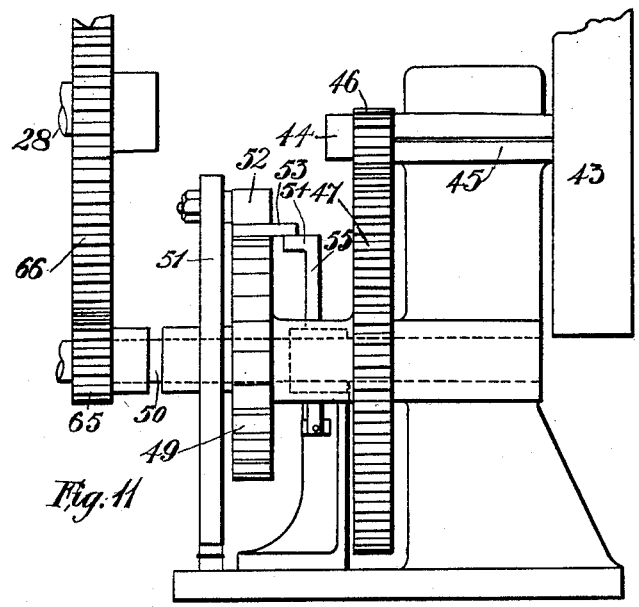
Figs. 11 and 12 are respectively a side view and front view of mechanism for synchronizing the operation of the prover with that of the molder and preliminary shaper.
Figure 12:
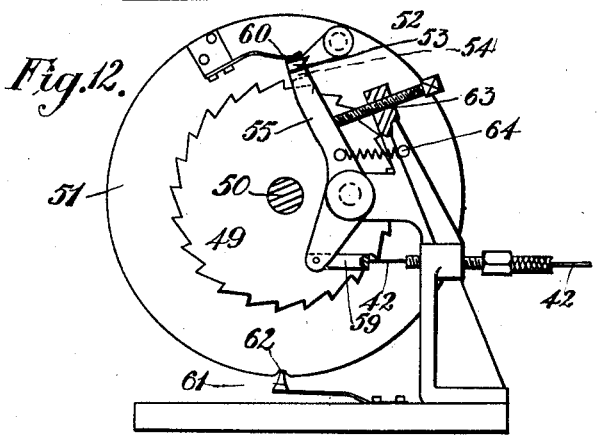

Details of one form of trip mechanism and intermittent driving gear are shown on Figs. 11 and 12. A driving pulley 43 is mounted on a shaft 44 adapted to rotate continuously in a bearing 45. A pinion 46 on this shaft meshes with a wheel 47 integral with a ratchet wheel 49, and loose on a shaft 50. A disk 51 fixed on the shaft 50 carries a pawl 52 adapted when free to be moved by a spring 60 into engagement with the ratchet wheel 49. A projection 53 on the pawl is adapted to engage with a projection 54 on the end of a trip lever 55 when the latter is in a position determined by a stop 63 and a spring 64. One end of the Bowden wire 42 is connected by a link 59 to the lower end of the lever 55 and whenever a piece of dough strikes the plate 40, Fig. 1, and moves the lever 41, the wire 42 pulls the trip lever 55. This causes the trip lever to move away from the pawl 52 which, engages with the continuously moving ratchet wheel 49, so that the disk 51 and therefore the shaft 50 is rotated and by means of a pinion 65 and a wheel 66 rotates the shaft 28 sufficiently to drive the conveyer forward by an amount equal to the pitch of the carriers. The disk 51 only makes one revolution to effect this movement, the gear ratio being arranged to suit. When the disk 51 completes a revolution, the projection 53 rides up the projection 54 on the trip lever 55 which has in the meantime returned to its position of rest against the stop 63. The pawl 52 is thereupon disengaged from the ratchet wheel 49 and the disk is held stationary by a catch 61 entering a notch 62 in the disk. The shaft 50 and therefore the shaft 28 remain stationary until another piece of dough is delivered into the conveyer.

The dough carried through the prover is finally delivered at the looped track 23. In a small bakery where it is usual to treat one batch of loaves at a time, the prover may be of a size to contain one batch, for instance 200 loaves. When the batch has been passed through the molder, preliminary shaper and into the prover, the latter can then be run to discharge the proved pieces of dough, which can be passed by any suitable means, not shown in Figs. 1 to 3, to a cottage or other shaper according to the peculiar shape required for the loaves, a simple form of cottage shaper being one of the known type comprising a shaped roller rotating within a shaped casing. Should a second molding and a cylindrical shaping be desired, however, the pieces of dough delivered by the prover may be allowed to fall on the conveyer 31, Figs. 1 to 3, and be delivered thereby to the molder 35 and shaper 36, the opening 29 in the top of the casing being closed by a suitable cover. It may be preferred to continuously feed pieces of dough to the molder 35, shaper 36, prover and thence to a cottage or other shaper. In such a case an arrangement such as diagrammatically indicated in Figs. 13 and 14 may be used. Here the pieces of dough placed on the conveyer 31 and after treatment by the molder 35, shaper 36 and prover, as above described with reference to Figs. 1 to 3, are delivered on to another conveyer 67 and by that fed into the cottage shaper 68. Should it be desired to cut out the cottage shaper and allow a batch to pass from the prover again on to the conveyer 31, and thence through the molder 35 and shaper 36, the rollers 69, 70, are wide enough to allow the conveyer 67 to be moved aside to an inoperative position, or any other arrangement may be adopted for this purpose. The combination last described will thus permit of the continuous molding and shaping of cottage or other peculiarly shaped loaves, or the making in batches of twice molded and cylindrically shaped loaves suitable for what is known as tin bread and sometimes as pan bread.

In larger installations it may be desirable to work continuously whether making cottage or tin bread, and in the latter case to subject the dough to a second molding. Such an installation is diagrammatically indicated in Fig. 15. When cottage loaves are required the pieces of dough are fed by the conveyer 31, to the molder 35 and preliminary shaper 36, pass through the prover, and are delivered on to a conveyer 67 and thereby to the cottage shaper 68. When it is desired to subject the pieces of dough to a second molding operation a conveyer 71 is brought into position to catch the pieces delivered by the conveyer 67 and to deliver them to a second molder 72 and shaper 73 similar to the first molder 35 and shaper 36. The shaper 73 may deliver the pieces to a table 74.

It is sometimes desirable that each clot or piece of dough shall be in an elongated form when fed to the molder and it may in some cases be passed through a former or extender as indicated at 75 in Figs. 13 and 15 instead of placing it direct on to the conveyer 31. The former 75 may comprise two endless bands 76, 77, Fig. 16, running in opposite directions at different speeds the construction being similar to that of the shaper 36, the bands 76, 77, however, being much wider so that the clot or piece of dough which passes between them is elongated by the time it is delivered on to the conveyer 31 or on to the feeding band of the molder 35. By presenting an elongated clot to the spindle of the molder 35 it will be wound thereon with a greater number of turns and the wound piece will be more compact. Moreover the small pieces of dough which are frequently thrown into a clot to make up the correct weight in the case of hand scaling are rolled into the clot so that a more regular clot is formed before it reaches the molder.

I claim:—

1. Apparatus for molding and shaping dough, comprising a molding machine adapted to coil a piece of dough to form a tensioned clot, a preliminary shaper adapted to roll the said tensioned clot into a substantially cylindrical form, a prover having an endless conveyer adapted to receive the clot so shaped, and a final shaper adapted to receive the clot from said endless conveyer and to shape it to the required final shape.

2. Apparatus for molding and shaping dough, comprising a molding machine adapted to coil a piece of dough to form a tensioned clot, a preliminary shaper adapted to roll the said tensioned clot into a substantially cylindrical form, a prover having an endless conveyer adapted to receive the clot so shaped, and means for returning said clot to the molding apparatus for a second treatment.

3. Apparatus for molding and shaping dough, comprising a molding machine adapted to coil a piece of dough to form a tensioned clot, a preliminary shaper adapted to roll the said tensioned clot into a substantially cylindrical form, a prover having an endless conveyer adapted to receive the clot so shaped, a final shaper adapted to receive the clot from said endless conveyer and to shape it to the required final shape, and means for diverting the clot from the prover to the molding apparatus for a second treatment before it is passed to the final shaper.

4. Apparatus for molding and shaping dough comprising a molding machine adapted to coil a piece of dough to form a tensioned clot, a preliminary shaper adapted to roll the said tensioned clot into a substantially cylindrical form, a prover having an endless conveyer adapted to receive the clot so shaped, and a final shaper adapted to receive the clot from said endless conveyer and to shape it to the required final shape, a second molding apparatus, and means for diverting the clot from the prover to the second molding apparatus when the final shaper is not required.

5. Apparatus for molding and shaping dough comprising a series of elements consisting of an extender for extending a clot of dough, a molder adapted to coil the extended clot to produce a tensioned clot, a prover, having an endless conveyer adapted to receive said tensioned clot, all of said elements being arranged to work in series, substantially as and for the purpose hereinbefore set forth.

6. Apparatus for molding and shaping dough comprising a series of elements consisting of an extender for extending a clot of dough, a molder adapted to coil the extended clot to produce a tensioned clot, a prover, having an endless conveyer adapted to receive said tensioned clot, a final shaper adapted to receive the clot from said prover, all of said elements being arranged to work in series, substantially as and for the purpose hereinbefore set forth.

7. In combination, a number of elements consisting of a dough molding apparatus adapted to coil clots of dough to produce tensioned clots, a preliminary shaper, a prover and a final shaper, said elements being arranged to work in series, said prover having an endless conveyer, means for driving said conveyer intermittently, and automatic means for synchronizing the intermittent movements of the conveyer with the delivery of the clots from the preliminary shaper.

In testimony whereof I have signed my name to this specification in the presence of two subscribing witnesses.

LAURENCE EMBREY.

Witnesses:
  JOHN THOMAS HALL,
  FRANK MADSLEY.